(12) United States Patent
Daqqa et al.

(10) Patent No.: US 9,783,067 B2
(45) Date of Patent: Oct. 10, 2017

(54) METHOD AND ARRANGEMENT FOR PROVIDING AN ELECTRICAL POWER FOR AN ON-BOARD POWER SUPPLY SYSTEM OF A MOTOR VEHICLE

(71) Applicant: Dr. Ing. h.c. F. Porsche Aktiengesellschaft, Stuttgart (DE)

(72) Inventors: Naser Abu Daqqa, Vaihingen an der Enz (DE); Heinz Rebholz, Neuhausen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 989 days.

(21) Appl. No.: 14/038,089

(22) Filed: Sep. 26, 2013

(65) Prior Publication Data

US 2014/0103710 A1   Apr. 17, 2014

(30) Foreign Application Priority Data

Oct. 12, 2012   (DE) .................. 10 2012 109 725

(51) Int. Cl.
*B60L 1/00*   (2006.01)
*B60L 11/18*   (2006.01)
(Continued)

(52) U.S. Cl.
CPC .......... *B60L 11/18* (2013.01); *B60L 11/1864* (2013.01); *B60L 11/1868* (2013.01); *B60L 15/007* (2013.01); *B60L 2210/10* (2013.01); *B60L 2220/42* (2013.01); *H02J 2001/008* (2013.01); *Y02T 10/645* (2013.01); *Y02T 10/648* (2013.01); *Y02T 10/7005* (2013.01); *Y02T 10/7061* (2013.01); *Y02T 10/7066* (2013.01); *Y02T 10/7216* (2013.01)

(58) Field of Classification Search
CPC . B60L 11/18; H02M 3/158; H02J 1/10; H02J 7/35; H02J 2001/008
See application file for complete search history.

(56) References Cited

U.S. PATENT DOCUMENTS 6,154,381 A   11/2000   Kajouke et al.
6,314,009 B1  11/2001   Dittmer et al.
(Continued)

FOREIGN PATENT DOCUMENTS

DE   20 2010 000 551       4/2010
FR   WO 2012085459 A1 *  6/2012   ............ H02M 3/285
(Continued)

OTHER PUBLICATIONS

Korean Patent Application No. 10-2013-121378 Office Action.
German Search Report of Feb. 25, 2013.

*Primary Examiner* — Daniel Cavallari
(74) *Attorney, Agent, or Firm* — Gerald E. Hespos; Michael J. Porco; Matthew T. Hespos

(57) ABSTRACT

A motor vehicle has a high-voltage battery and two separate electric machines. Each electric machine is associated with a power electronics unit, and each power electronics unit has a DC-to-DC converter. Each DC-to-DC converter is designed to reduce a high voltage of the high-voltage battery to a predetermined voltage. The two DC-to-DC converters of the two power electronics units are connected electrically in parallel and are set to different voltage values.

14 Claims, 1 Drawing Sheet

(51) Int. Cl.
*B60L 15/00* (2006.01)
*H02J 1/00* (2006.01)

(56) References Cited

U.S. PATENT DOCUMENTS

| | | | |
|---|---|---|---|
| 6,954,365 | B2 | 10/2005 | Deguchi |
| 2012/0176817 | A1 | 7/2012 | Lu |

FOREIGN PATENT DOCUMENTS

| | | |
|---|---|---|
| JP | H1032806 | 2/1998 |
| JP | H10191624 | 7/1998 |
| JP | 2000184608 | 6/2000 |
| JP | 2004-242371 | 8/2004 |
| JP | 2004222404 | 8/2004 |
| JP | 2005086988 | 3/2005 |
| JP | 2009213223 | 9/2009 |
| JP | 2012010434 | 1/2012 |
| JP | 2013021865 | 1/2013 |

\* cited by examiner

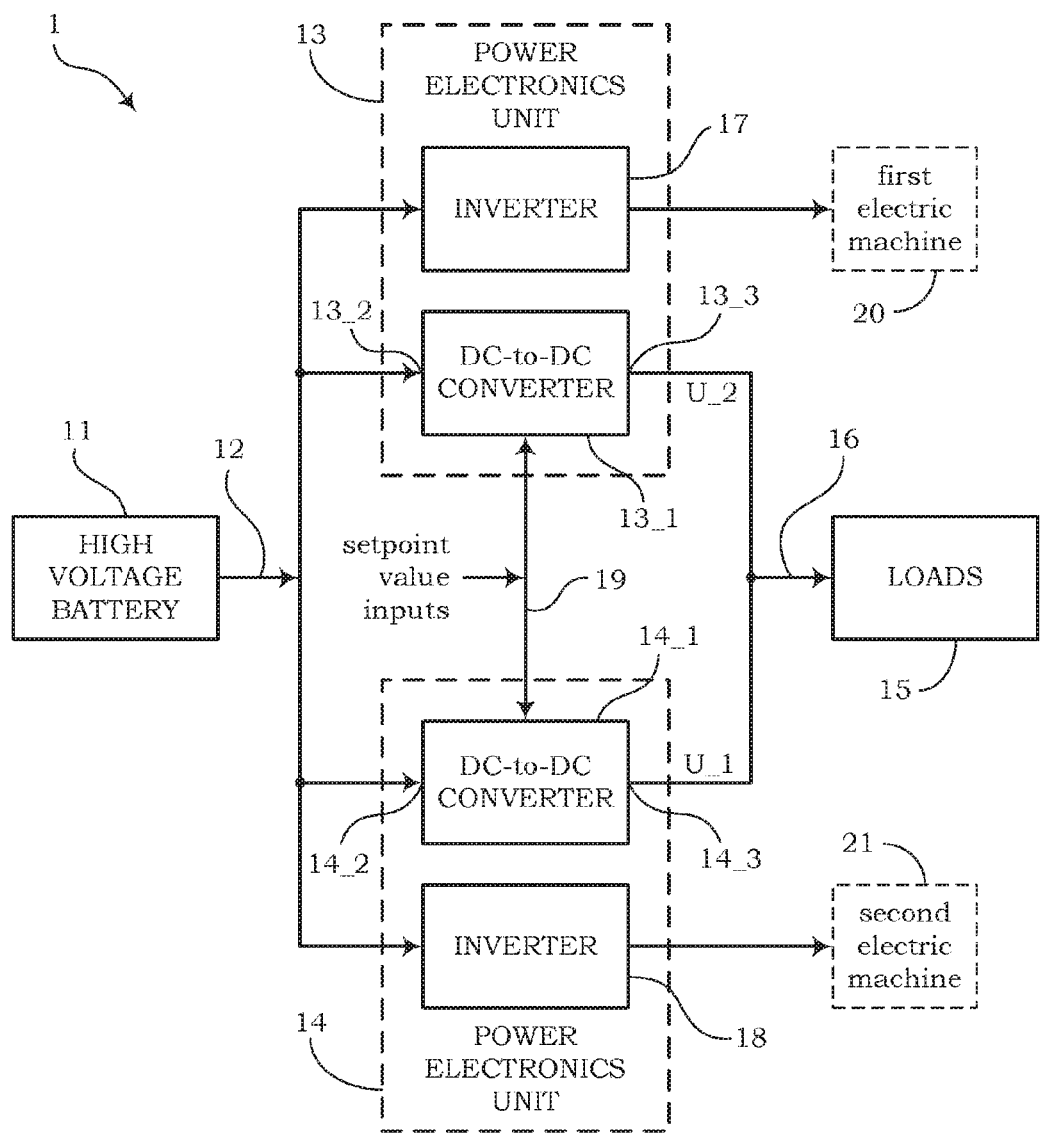

METHOD AND ARRANGEMENT FOR PROVIDING AN ELECTRICAL POWER FOR AN ON-BOARD POWER SUPPLY SYSTEM OF A MOTOR VEHICLE

CROSS REFERENCE TO RELATED APPLICATION

This application claims priority under 35 USC 119 to German Patent Appl. No. 10 2012 109 725.9 filed on Oct. 12, 2012, the entire disclosure of which is incorporated herein by reference.

BACKGROUND

1. Field of the Invention

The invention relates to a method and a corresponding arrangement for providing an electrical power for an on-board power supply system of a motor vehicle.

2. Description of the Related Art

Electrical energy is becoming increasingly important in a motor vehicle due to its versatility and controllability for implementing new functions. However, a reliable and efficient on-board power supply system is a precondition for using electrical energy in the motor vehicle. More particularly, intelligent energy management is required to ensure that sufficient energy can be made available to the various consumers at any time. Thus, a possible change in load on the on-board power supply system needs to be manageable. This means that the energy needs to be made available in such a way that sufficient energy can be made available to each consumer depending on the importance of the consumer at a given point in time.

An increasing number of electrical loads and a wide spectrum of new safety and comfort functions in a motor vehicle often also necessitate the use of relatively high power energy supplies within the motor vehicle. Functions such as an electromechanical brake, an electrical boost function for a normal internal combustion engine or electromagnetically controlled valves, for example, require loads that often can no longer be supplied sufficiently by a conventional 12 volt on-board power supply system.

U.S. Pat. No. 6,154,381 discloses a system with a plurality of DC-to-DC converters connected in parallel. The system disclosed therein comprises parallel DC-to-DC converters that are controlled by an input control signal interface and an output control signal interface using a smart controller. The disclosed system comprises a smart controller that is based on the fact that the module efficiency varies with the load present, with the result that an optimum operating point exists. However, this requires very complex actuation of the DC-to-DC converters since a synchronized actuation always needs to take place. For this purpose, an additional sensor system and additional wiring is required.

In the context of the present description, a hybrid or electric vehicle with at least two separate electric machines has been considered. Both electric machines are 3-phase synchronous machines, i.e., they are supplied with a 3-phase alternating current. The motor vehicle also has a high-voltage battery that is used for providing direct current. To operate the two electric machines, the direct current made available by the high-voltage battery first needs to be converted into a suitable alternating current, namely the abovementioned 3-phase alternating current. Therefore, in each case one power electronics unit is associated with both electric machines. Each power electronics unit has an inverter to convert the direct current of the high-voltage battery into a respectively suitable alternating current for the respective electric machine.

Against this background of the prior art, the 12 volt on-board power supply system may not be able to supply sufficient power at a specific point in time for all of the rising number of electrical loads and all of the wide spectrum of new safety and comfort functions. Accordingly, an object of the invention is to avoid an associated voltage dip in the event of a short-term overload of the conventional 12 volt on-board power supply system, but instead continuing to provide electrical power.

SUMMARY OF THE INVENTION

The invention relates to a method for providing an electrical power for an on-board power supply system of a motor vehicle comprising a high-voltage battery and two separate electric machines. Each of the electric machines is associated with a power electronics unit, and each power electronics unit has a DC-to-DC converter. The respective DC-to-DC converter is designed to reduce a high voltage of the high-voltage battery to a voltage to be predetermined. The two DC-to-DC converters are connected electrically in parallel, and the two DC-to-DC converters are adjusted to different voltage values. The voltage value to which a respective DC-to-DC converter is adjusted indicates the voltage that is present at the output of the corresponding DC-to-DC converter, i.e. to which the high voltage is to be reduced.

The on-board power supply system may be a conventional 12 volt on-board power supply system.

The different voltage values to which the DC-to-DC converters are adjusted differ by a delta value that is dependent on the on-board power supply system topology, typically in a range of from 0.5 volt to 2 volts.

If a 12 volt on-board power supply system is provided, one of the two DC-to-DC converters may be adjusted to a first voltage value, for example to 14.5 volts, and the other DC-to-DC converter may be adjusted to a second voltage value, for example to the difference between the first voltage value and a delta value of, for example, 1 volt, i.e. to 13.5 volts. The parallel circuit comprising the two DC-to-DC converters enables double the electrical power to be supplied to the on-board power supply system in relation to only one DC-to-DC converter. The actuation of the two DC-to-DC converters is adjusted to different setpoint voltage values. If the on-board power supply system requires more electrical power than one of the DC-to-DC converters provides, a voltage dip on the on-board power supply system can take place without the parallel circuit comprising the two DC-to-DC converters, and this voltage dip would no longer ensure safe operation of electrical units in the vehicle. However, the second DC-to-DC converter of the invention is connected electrically in parallel with the first DC-to-DC converter and is adjusted to a lower setpoint voltage value. Thus, in the event of a sudden rise in the required power on the 12 volt power supply system, the voltage dip is limited to the setpoint voltage value of the second DC-to-DC converter. The voltage dip thus produced, corresponding to the delta value, is within the range of "normal" voltage fluctuations on the on-board power supply system occurring in the vehicle and can be ignored.

A voltage dip in a power supply refers to a situation where a supply voltage is reduced for a short period of time. Such a voltage dip arises when a strong current loads the on-board power supply system. This is particularly the case when switching on consumers with a high power or specific motors which require a high runup current. The parallel circuit comprising two DC-to-DC converters that can be actuated and adjusted independently of one another compensates for or severely restricts the voltage dip.

The DC-to-DC converter in each of the two power electronics units is an electrical circuit that converts a DC voltage supplied at the input into a DC voltage with a higher, lower or inverted voltage level. In the context of the present invention, each of the two DC-to-DC converters converts the high voltage of the high-voltage battery into a DC voltage with a lower voltage level. The DC voltage with the lower voltage level, which is then present at the respective output of the corresponding DC-to-DC converter, typically is in the range of from 10 V to 16 V.

One of the two electric machines may be arranged on a rear axle and the other of the two electric machines may be arranged on a front axle of the motor vehicle.

As noted above, the two DC-to-DC converters are actuated independently of one another. In this case, the actuation of the two DC-to-DC converters can be performed respectively via a databus, such as a CAN (Controller Area Network) bus.

The invention also relates to an arrangement for providing an electrical power for an on-board power supply system of a motor vehicle. The arrangement comprises a high-voltage battery and two separate electric machines. Each electric machine is associated with its own power electronics unit that has a DC-to-DC converter. The electric machine, the power electronics unit and/or the DC-to-DC converter can be integrated or separate. A respective DC-to-DC converter is designed to reduce a high voltage of the high-voltage battery to a voltage to be predetermined, and the two DC-to-DC converters of the two power electronics units are connected electrically in parallel. The two DC-to-DC converters also are adjusted to different voltage values.

The on-board power supply system can be a 12 volt on-board power supply system. The different voltage values to which the DC-to-DC converters are adjusted can differ from one another by a delta value selected from a range of from 0.5 volt to 2 volts. For example, one of the two DC-to-DC converters can be adjusted to a voltage value of 14.5 volts and the other of the two DC-to-DC converters, given a delta value of 1 volt, can be adjusted to a voltage value of 13.5 volts, in the case of a 12 volt on-board power supply system. Naturally, another on-board power supply system also is possible, for example a 48 volt on-board power supply system, with correspondingly different voltage values.

One of the two electric machines can be arranged on a rear axle and the other of the two electric machines can be arranged on a front axle of the motor vehicle. Actuation of the two DC-to-DC converters should be performed independently of one another respectively via a databus, for example a CAN (Controller Area Network) bus.

The present arrangement of the invention and the method of the invention are applicable to a hybrid vehicle or an electric vehicle.

Further advantages and configurations of the invention result from the description and the attached drawing.

It goes without saying that the features mentioned above and yet to be explained below can be used not only in the respectively cited combination, but also in the other combinations or on their own, without departing from the scope of the invention.

BRIEF DESCRIPTION OF THE DRAWINGS

FIG. 1 shows a possible arrangement of an embodiment of the arrangement according to the invention.

DETAILED DESCRIPTION OF THE PREFERRED EMBODIMENTS

FIG. 1 shows an arrangement 1 for providing electrical energy for an on-board power supply system in a motor vehicle. The circuit 1 has a high-voltage battery 11 to supply power to an on-board power supply system of the motor vehicle and to two electric machines 20, 21 of the motor vehicle. Power electronics units 13, 14 are associated respectively with the two electric machines 20, 21. The electric machines 20, 21 are arranged separately from one another and can be operated independently of one another. It is possible for one of the electric machines to be located on a front axle of the motor vehicle and for the other electric machine to be located on a rear axle of the motor vehicle. Each of the two power electronics units 13, 14 has an inverter 17, 18 for converting direct current of the high-voltage battery 11 into a respectively suitable alternating current for the respective electric machine 20, 21. In addition, a DC-to-DC converter is associated with each of the two power electronics units 13, 14. A DC-to-DC converter 13_1 is associated with the power electronics unit 13 and a DC-to-DC converter 14_1 is associated with the power electronics unit 14. The DC-to-DC converters 13_1 and 14_1 are connected electrically in parallel with one another. Each of the DC-to-DC converters 13_1 and 14_1 is designed to convert a voltage, such as in this case a DC voltage supplied respectively at the input 13_2 or 14_2, into a DC voltage with a lower voltage level. In the case illustrated here, a DC voltage supplied by the high-voltage battery 11 is routed via a common high-voltage conductor 12 to the respective inputs 13_2, 14_2 of the DC-to-DC converter 13_1, 14_1. The DC-to-DC converter 13_1 converts the DC voltage supplied at the input 13_2 to a DC voltage with a lower voltage level. The DC-to-DC converter 14_1 also converts the DC voltage supplied at the input 14_2 into a DC voltage with a lower voltage level since the loads 15 or functions to be supplied within the motor vehicle need to be supplied at a lower voltage than the high voltage of the high-voltage battery 11.

One of the DC-to-DC converters is adjusted to a different voltage value than the other DC-to-DC converter. More particularly, the DC-to-DC converters 13_1 and 14_1 differ in respect of the voltage values to which the high voltage supplied at the respective input 13_2 or 14_2 is reduced. The adjusted voltage values therefore define the voltage present at the output 13_3, 14_3 of the respective DC-to-DC converter 13_1, or 14_1. The voltage at the output 13_3 of the DC-to-DC converter 13_1 is adjusted to a setpoint voltage value U_2 (for example to 13.5 volts), while the voltage at the output 14_3 of the DC-to-DC converter 14_1 is adjusted to a setpoint voltage value U_1 (for example to 14.5 volts). Therefore, the voltage values at the respective outputs of the DC-to-DC converters differ by a delta value of U_1 minus U_2 (for example 1 volt). The loads 15 distributed in a motor vehicle are supplied with electrical energy of the on-board power supply system via a bus 16. The voltage of the DC-to-DC converter 14_1 is greater than that of the DC-to-DC converter 13_1. Thus, the on-board power supply system first is supplied by the DC-to-DC converter 14_1 due to the parallel circuit, when the loads 15 require a first predetermined required power. If the DC-to-DC converter 14_1 is overloaded temporarily by a rise in the first predetermined required power, i.e. the DC-to-DC converter 14_1 cannot keep the on-board power supply system stable on its own or at U_1, the voltage dip is only down to the voltage of the DC-to-DC converter 13_1 and is within a range of negligible voltage fluctuations.

The invention does not require additional sensor systems or additional wiring for synchronization of the DC-to-DC converters. To adjust the different setpoint voltage values of the two DC-to-DC converters, the setpoint value inputs of the two DC-to-DC converters merely need to be adjusted separately from one another via a provided databus 19, for example a CAN (Controller Area Network) bus. To extend the life of the DC-to-DC converters, a periodic or random change in the setpoint value inputs between the DC-to-DC converters can take place.

What is claimed is:

1. A motor vehicle comprising:
   a battery configured to supply electrical power at a first direct-current (DC) voltage value;
   first and second electric machines;
   a first power electronics unit including an input, a DC-to-DC converter, a first output, and a second output, the input of the first power electronics unit configured to receive the first DC voltage value from the battery, the first output of the first power electronics unit configured to supply electrical power to the first electric machine; and
   a second power electronics unit including an input, a DC-to-DC converter, a first output, and a second output, the input of the second power electronics unit configured to receive the first DC voltage value from the battery, the first output of the second power electronics unit configured to supply electrical power to the second electric machine;
   wherein the DC-to-DC converter of the first power electronics unit is configured to reduce the first DC voltage value supplied by the battery to a second DC voltage value that is lower than the first DC voltage value;
   wherein the DC-to-DC converter of the second power electronics unit is configured to reduce the first DC voltage value supplied by the battery to a third DC voltage value that is lower than the first DC voltage value but higher than the second DC voltage value;
   wherein the DC-to-DC converter of the first power electronics unit is configured to provide the second DC voltage value from the second output of the first power electronics unit to a bus associated with an on-board power supply system connected to at least one load;
   wherein the DC-to-DC converter of the second power electronics unit is configured to provide the third DC voltage value from the second output of the second power electronics unit to the bus associated with the on-board power supply system connected to the at least one load; and
   wherein the DC-to-DC converter of the first power electronics unit is connected in parallel with the DC-to-DC converter of the second power electronics unit.

2. The motor vehicle of claim 1, wherein the on-board power supply system is a 12-volt on-board power supply system.

3. The motor vehicle of claim 1, wherein the difference between the third DC voltage value and the second DC voltage value is adjusted to be within a range from about 0.5 volts to about 2.0 volts.

4. The motor vehicle of claim 1, wherein the first electric machine is arranged on a front axle of the motor vehicle and the second electric machine is arranged on a rear axle of the motor vehicle, and wherein the first and second electric machines are actuated independently.

5. The motor vehicle of claim 1, wherein the motor vehicle is a hybrid vehicle.

6. The motor vehicle of claim 1, wherein the motor vehicle is an electric vehicle.

7. An apparatus for providing electrical power for an on-board power supply system of a motor vehicle, the apparatus comprising:
   a battery;
   first and second electric machines;
   a first power electronics unit associated with the first electric machine, the first power electronics unit including a first DC-to-DC converter configured to reduce a voltage of the battery to a first predetermined voltage that is lower than the battery voltage; and
   a second power electronics unit associated with the second electric machine, the second power electronics unit including a second DC-to-DC converter configured to reduce the voltage of the battery to a second predetermined voltage that is lower than the battery voltage and differs from the first predetermined voltage by a delta value.

8. The apparatus of claim 7, wherein the first and second power electronics units are connected in parallel.

9. The apparatus of claim 8, wherein the first and second predetermined voltages are supplied in parallel to a 12-volt on-board power supply system of the motor vehicle.

10. The apparatus of claim 7, further comprising a databus connected to the first and second DC-to-DC converters, wherein the databus is configured to provide setpoint value inputs to the first and second DC-to-DC converters to set the first and second predetermined voltages.

11. The apparatus of claim 10, wherein the databus sets the delta value within a range from about 0.5 volts to about 2.0 volts.

12. The apparatus of claim 10, wherein the databus sets the first DC-to-DC converter to a voltage value of 13.5 volts and sets the second DC-to-DC converter to a voltage value of 14.5 volts.

13. The apparatus of claim 10, wherein the databus actuates the first DC-to-DC converter independently of the second DC-to-DC converter.

14. The apparatus of claim 10, wherein the databus is a controller area network (CAN) bus.

* * * * *